US006285025B1

(12) United States Patent
Metel et al.

(10) Patent No.: US 6,285,025 B1
(45) Date of Patent: Sep. 4, 2001

(54) SOURCE OF FAST NEUTRAL MOLECULES

(75) Inventors: Alexander Metel, Istra; Sergei Grigoriev, Moscow, both of (RU)

(73) Assignee: Novatech, Moscow (RU)

( * ) Notice: Subject to any disclaimer, the term of this patent is extended or adjusted under 35 U.S.C. 154(b) by 0 days.

(21) Appl. No.: 09/155,336

(22) PCT Filed: Mar. 18, 1997

(86) PCT No.: PCT/RU97/00072

§ 371 Date: Sep. 24, 1998

§ 102(e) Date: Sep. 24, 1998

(87) PCT Pub. No.: WO97/36463

PCT Pub. Date: Oct. 2, 1997

(30) Foreign Application Priority Data

Mar. 25, 1996 (RU) ..................................... 96105636

(51) Int. Cl.[7] ............................ H01S 1/00; H01S 3/00

(52) U.S. Cl. ................................................ 250/251

(58) Field of Search ..................... 417/49; 315/111.41; 427/53.1; 204/192.12; 250/251

(56) References Cited

U.S. PATENT DOCUMENTS 4,063,340 * 12/1977 Blumenberg ..................... 29/25.16
5,241,244 * 8/1993 Cirri ................................ 315/111.41
5,451,308 9/1995 Sablev et al. .
5,503,725 4/1996 Savlev et al. .

* cited by examiner

*Primary Examiner*—Jack Berman
*Assistant Examiner*—Johnnie L Smith, II
(74) *Attorney, Agent, or Firm*—Knobbe, Martens, Olson & Bear, LLP

(57) ABSTRACT

A source of fast neutral molecules comprises a gas discharge chamber (1) with an anode (5), a cathode (7) and a gas discharge power supply (8), a charge transfer chamber (2) with additional electrodes (16), an accelerating grid (3) composed of grid elements (18) isolated electrically from each other and an accelerating voltage power supply (4). The width of the accelerating grid (3) exceeds within the ion-producing gas pressure range the ion charge transfer length $L=1/n\sigma$, n being gas molecule density and $\sigma$ being charge transfer collision cross-section. The negative pole of the accelerating voltage power supply (4) is connected through a resistor (11) to the charge transfer chamber (2), through resistors (17) to the additional electrodes (16) and through resistors (19) to the grid elements (18). This simplifies control of the device, increases its reliability and makes arc cathode spots resulting from electrical break-downs appear only on the accelerating grid ((3) thus excluding damage of the products under treatment and improving their quality.

10 Claims, 4 Drawing Sheets

SOURCE OF FAST NEUTRAL MOLECULES

FIELD OF THE INVENTION

The field of this invention is vacuum-plasma equipment and namely—broad cross-section beam sources of fast neutral molecules intended for cleaning and heating of tools or other products in a working vacuum chamber before coating deposition aimed at improving of adhesion and quality of the coatings.

PRIOR ART

Broad cross-section beam sources of ions and/or fast neutral gas molecules are widely known which use thermionic cathodes to generate the plasma ion emitter of the source. They allow to clean and to heat products in vacuum before coating deposition. Products treatment rate with fast neutral molecules is equal to the treatment rate with corresponding ions of the same kinetic energy. But in comparison with widely used ion sources the sources of fast neutral molecules are remarkable for easier transportation in vacuum of neutral accelerated particle beam and for independence of kinetic energy and of flow density distribution of particles bombarding a product on the product surface potential.

Disadvantages of known fast neutral molecule sources are: complex constructions and high cost prices, comparatively short useful life of the sources and impossibility of products etching with fast neutral molecules of reactive gases because of the use of thermionic cathodes which cannot work in reactive gases as well as damage of the products with arc spot traces as a result of electrical break-downs between the products under treatment and the plasma ion emitter of the source.

Another known accelerated particle source comprises a gas discharge chamber with a cold cathode, with an anode and with a gas discharge power supply, a case enveloping the gas discharge chamber with a flange for hermetic junction and electrical connection with a working vacuum chamber, an accelerating grid positioned between the gas discharge chamber and the part of the case adjoining the flange, an accelerating voltage power supply its positive pole being connected to one of the electrodes of the gas discharge chamber, exactly—to the cold cathode, and its negative pole being connected to the flange of the case as well as a means to admit an ion-producing gas to fill the gas discharge chamber (A. S. Metel. Broad cross-section accelerated particle beam sources on the basis of hollow cathode glow discharge.—In: Plazmennaya emissionnaya elektronika, tez. dokl., Ulan-Ude: Buriatsky institut yestestvennykh nauk SO AN USSR, p. 77–81, FIG. 2).

Up to 30–40 per cent of all ions produced in the gas discharge chamber are being accelerated with the potential drop between the plasma ion emitter established in the gas discharge chamber and a 35 cm long, 8 cm wide and 70–90 per cent transparent accelerating grid and are entering through the holes of the grid the adjoining the flange part of the case and are further entering the working vacuum chamber.

The adjoining the flange part of the case and the working vacuum chamber are in fact being used as a charge transfer chamber because in the ion-producing gas pressure range of about 0.1 Pa the charge transfer length L being equal to a distance from the accelerating grid at which 63.2 per cent (1-1/e) of all accelerated ions turn into fast neutral molecules as a result of charge transfer collisions with gas molecules and being defined with the following equation:

$$L=1/n\sigma, \text{ where}$$

n is gas molecule density in the chamber, and

σ is charge transfer collision cross-section, is about several dozens cm for ions with 0.3–3 keV energy. For this reason practically all the accelerated ions turn into fast neutral molecules as a result of charge transfer collisions in a working vacuum chamber that is typically 0.5–1 m wide. Kinetic energy and velocity direction of the accelerated particles change negligibly after the charge transfer collisions and electric current in the working vacuum chamber circuit is mainly carried with slow secondary ions produced as a result of the charge transfer collisions and coming to the walls of the chamber. The ions come also to the walls of the adjoining the flange part of the case, to the products being treated with accelerated particles inside the working vacuum chamber as well as to the accelerating grid.

However only a very small part of slow secondary ions produced as a result of charge transfer collisions come to the accelerating grid because the charge transfer length exceeds the grid width and charge transfer collisions occur mainly at distances from the grid exceeding its width. For this reason the current in the working vacuum chamber circuit is practically equal to the current of accelerated ions entering the working vacuum chamber through the accelerating grid. When this current is less than the minimum current of a stable vacuum arc which may result from an electrical break-down between the working vacuum chamber and the plasma ion emitter of the gas discharge chamber, ignition of stationary arc with arc spots appearing on the walls of the working vacuum chamber and on the surfaces of the products under treatment can be eliminated by means, for instance, of the positive pole of the accelerating voltage power supply connection to the electrode of the gas discharge chamber through a current-limiting resistor.

When this current exceeds the minimum current of a stable vacuum arc, it is impossible to prevent the arc ignition by means of a current-limiting resistor. In this case the accelerating voltage power supply unit should include an arc extinguishing circuit which react, for instance, upon an abrupt drop of accelerating voltage between the electrode of the gas discharge chamber and the working vacuum chamber down to the value of arc discharge voltage (less than 100 V) and switches off the accelerating voltage for a time interval long enough for expiring of arc spots and then switches on the accelerating voltage again. The damage extent of the products under treatment with the arc spot traces depends on the arc current and on the arc duration, i. e. on the quickness of the arc extinguishing circuit response. But the damage of the products is inevitable because in any case the arc extinguishing needs at first the arc ignition.

Positive space charge of accelerated ions and of slow secondary ions in the working vacuum chamber is neutralised with electrons appearing in the chamber as a result of ion-electron emission from the inner walls of the chamber. As a result the vacuum chamber and the adjoining the flange part of the case are filled with quasi-neutral synthesised plasma with a positive relative to the chamber and the case walls potential. To limit electron flow from the synthesised plasma through the accelerating grid into the gas discharge chamber in order to prevent overheating of the gas discharge chamber with accelerated electrons a negative to the case potential $U_g$ (about 100 V) is put to the accelerating grid from an additional power supply unit.

In order to prevent contamination of the products under treatment with the material of the accelerating grid being sputtered with secondary ions from the synthesised plasma the negative potential of the grid is to be regulated in such a way that it would not exceed the minimum electron cut-off potential which is decreasing with the accelerated ion current decrease.

While using a gas discharge chamber with a cold cathode, the electron current should not be cut off completely as bombardment of the gas discharge chamber cold cathode with accelerated electrons results in a decrease of the discharge voltage and of energetic cost of ions produced.

For this reason the grid potential $U_g$ is to be regulated in such a way that the current of accelerated electrons, mainly being less than 5–10 per cent of the accelerated ion beam current, would flow in the gas discharge chamber circuit.

Disadvantages of the device are low quality of treated with fast molecules products resulting from their surfaces damage with arc spot traces during electrical brake-downs and complexity of the device control by regulating the negative potential of the accelerating grid by every change of beam current, of accelerating voltage, of gas pressure or of sort of ion-producing gas.

DISCLOSURE OF THE INVENTION

The present invention has for its principal object to provide a fast neutral molecule source with an easier control and a higher reliability which allows to improve quality of products treated with this source.

The object is accomplished by providing a source of fast neutral molecules comprising a gas discharge chamber with a gas discharge power supply, a charge transfer chamber, an accelerating grid positioned between the gas discharge chamber and the charge transfer chamber, an accelerating voltage power supply its positive pole being connected to one of the electrodes of the gas discharge chamber and its negative pole being connected to the charge transfer chamber as well as a means to admit an ion-producing gas to fill the gas discharge chamber wherein, according to the invention, the accelerating grid is connected to the negative pole of the accelerating voltage power supply and the width A of the accelerating grid exceeds within the ion-producing gas pressure range the charge transfer length L being defined with the following equation:

$$L=1/n\sigma, \text{ where} \quad (1)$$

n is gas molecule density in the chamber, and

σ is charge transfer collision cross-section.

It is advisable that the negative pole of the accelerating voltage power supply is connected to the charge transfer chamber through a resistor.

It is also advisable that additional electrodes electrically connected to the negative pole of the accelerating voltage power supply are positioned in the charge transfer chamber on the side of the accelerating grid.

When the accelerating voltage power supply has no arc extinguishing circuit it is quite reasonable that the accelerating grid is a set of separate isolated from each other grid elements connected to the negative pole of the accelerating voltage power supply through separate resistors.

It is expedient that additional electrodes are isolated from each other and electrically connected to the separate grid elements.

It is quite reasonable that the additional electrodes are isolated from each other and connected to the negative pole of the accelerating voltage power supply through separate resistors.

When it is needed to cover repeatedly the source being out of operation in order to protect it from contamination with impurities coming from the working vacuum chamber it is favourable that the additional electrodes are movable relative to the accelerating grid and can make up a screen covering the accelerating grid.

It is expedient that a connecting pipe of the means to admit an ion-producing gas to fill the gas discharge chamber is positioned on the charge transfer chamber.

While treating products with fast molecules in a large-sized working vacuum chamber it is quite reasonable that the working vacuum chamber is used as the charge transfer chamber.

While generating fast neutral molecules of reactive gases it is expedient that the gas discharge chamber cathode is a cold hollow cathode with an opening facing the accelerating grid.

BRIEF DESCRIPTION OF THE DRAWINGS

The following text explains the invention by means of description of embodiments and by the attached drawings where.

BEST WAYS OF CARRYING OUT THE INVENTION

Figure 1:
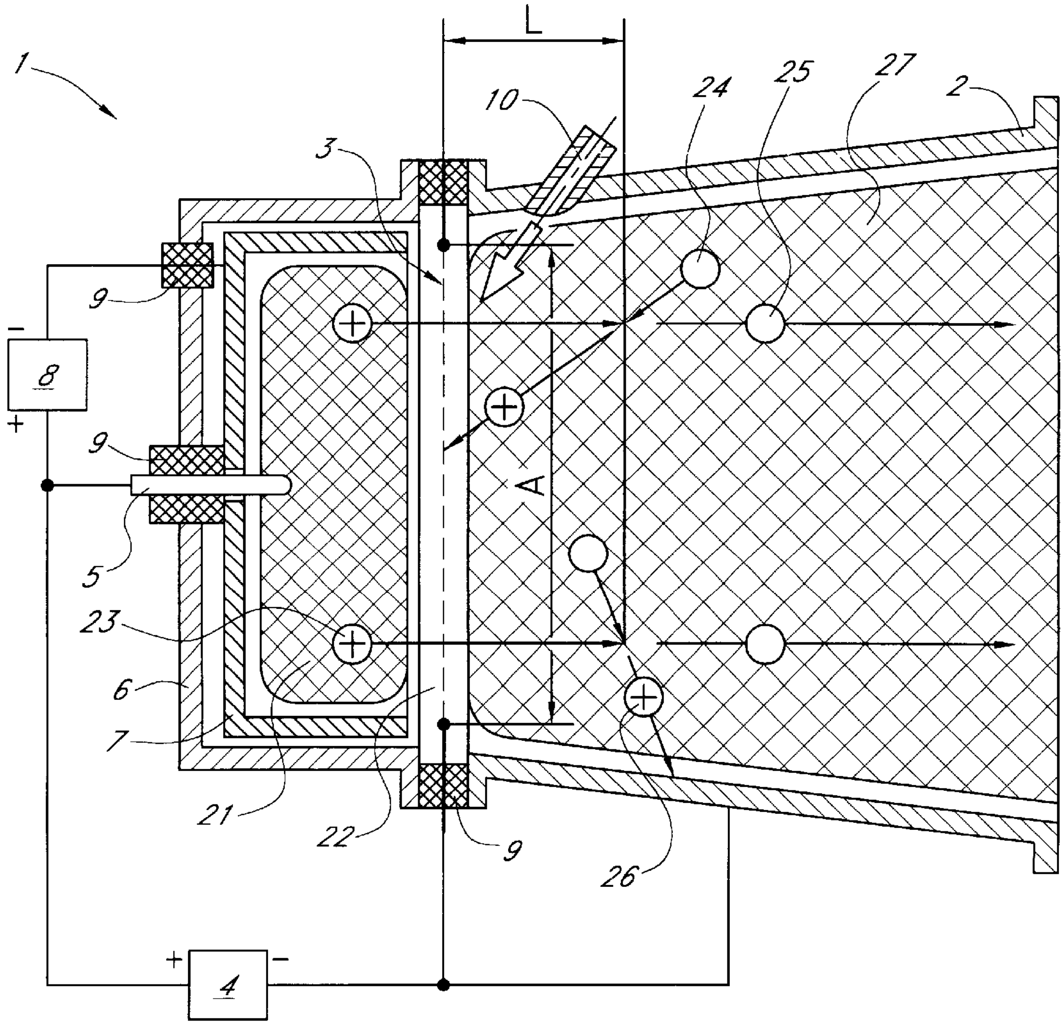
FIG. 1 is a schematic diagram of the source of fast neutral molecules.

The source of fast neutral molecules comprises a gas discharge chamber 1, a charge transfer chamber 2, an accelerating grid 3 positioned between them, an accelerating voltage power supply 4, its positive pole being connected to one of the electrodes of the gas discharge chamber 1, for instance, to the anode 5, and its negative pole being connected to the charge transfer chamber 2. The accelerating grid 3 is connected to the negative pole of the accelerating voltage power supply 4. The electrodes of the gas discharge chamber 1 are positioned in a case 6, are isolated from the case 6 and comprise, for instance, a cold hollow cathode 7 with a broad emission opening facing the accelerating grid 3 and the anode 5 which, for instance, enters the hollow cathode 7 through a special orifice in the wall of the cathode 7. The anode 5 is electrically connected to the positive pole of the gas discharge power supply 8 its negative pole being connected to the cathode 7. The accelerating grid 3 is connected to the accelerating voltage power supply 4 and the cathode 7, the anode 5 are connected to the gas discharge power supply 8 through isolators 9. The output opening of the charge transfer chamber 2 has a junction with a vacuum pumping system (omitted in the drawings) and on the charge transfer chamber 2 is positioned a connecting pipe 10 of the means to admit the ion-producing gas to fill the gas discharge chamber 1 through the accelerating grid 3. The width A of the accelerating grid 3 exceeds the charge transfer length L of accelerated ions within the ion-producing gas pressure range, the L being defined with the equation (1).

Figure 2:
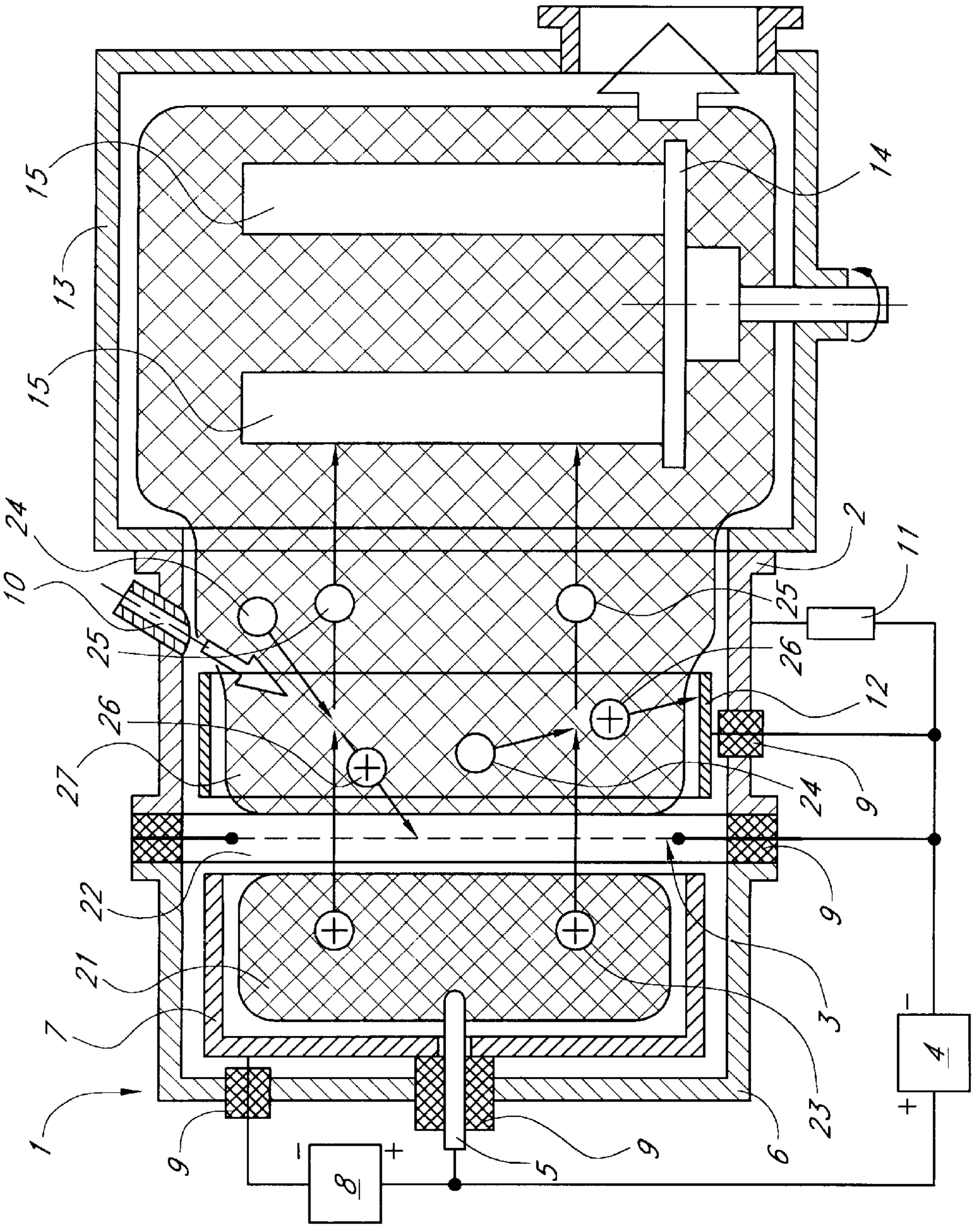
FIG. 2 is a schematic diagram of the source of fast neutral molecules with an additional electrode in the charge transfer chamber which is mounted on a working vacuum chamber.

Presented in the FIG. 2 modification of the source of fast neutral molecules is characterised in that the negative pole of the accelerating voltage power supply 4 is connected through a resistor 11 to the charge transfer chamber 2 wherein is positioned an additional electrode 12 electrically connected to the negative pole of the accelerating power supply 4 through the isolator 9. The source of fast neutral molecules is mounted on the working vacuum chamber 13 which is electrically connected to the charge transfer chamber 2. In the chamber 13 are positioned the products 15 to be treated with fast neutral molecules, for instance, on a rotating table 14 electrically connected to the working vacuum chamber 13.

Figure 3:
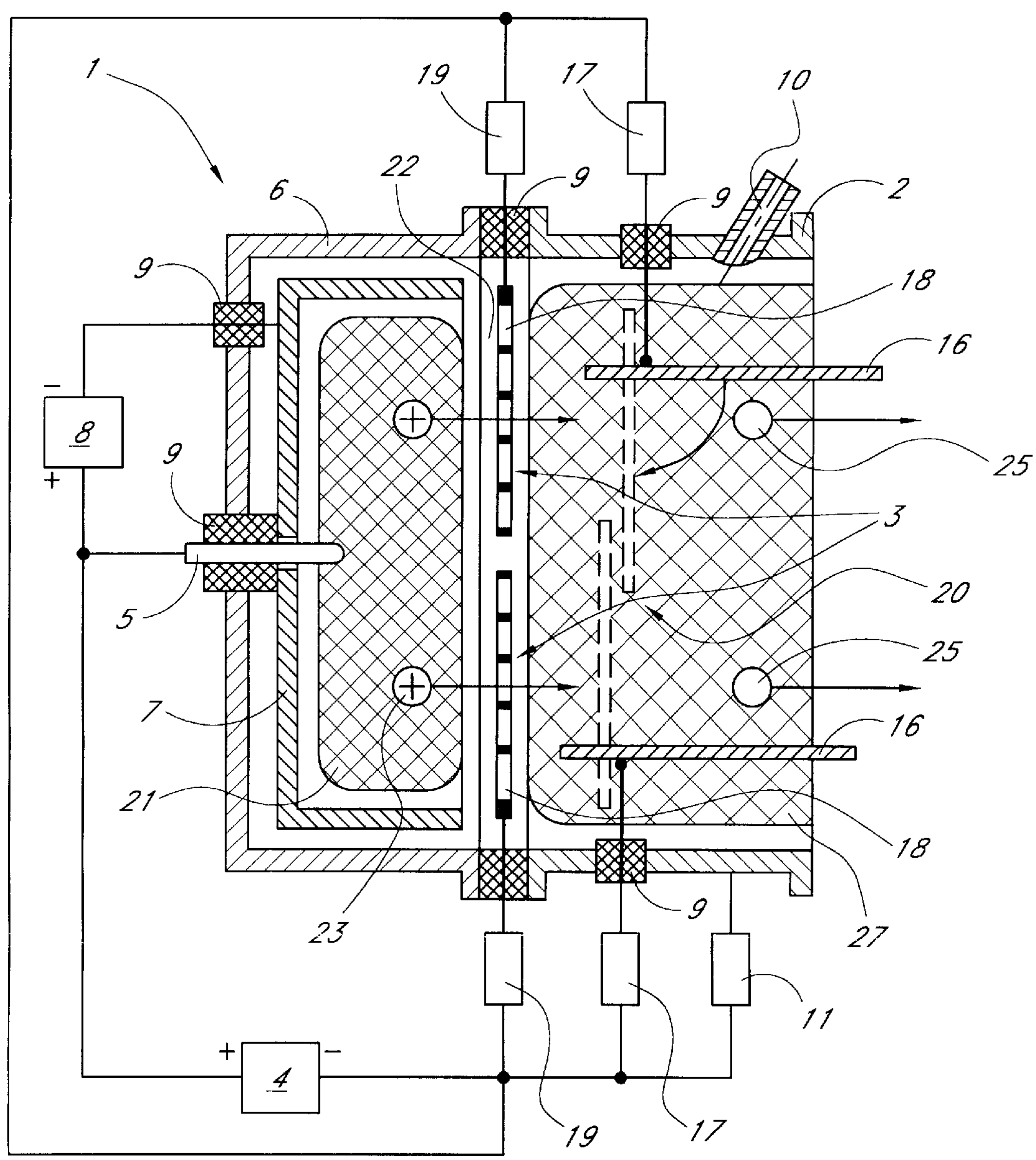
FIG. 3 is a schematic diagram of the source of fast neutral molecules with movable additional electrodes connected to the negative pole of the accelerating voltage power supply through separate resistors and making up in one of their positions a screen which covers the grid being a set of separate grid elements connected to the negative pole of the accelerating voltage power supply through separate resistors.

Presented in the FIG. 3 modification of the is characterised in that it comprises several additional electrodes 16 which are isolated from each other, connected to the negative pole of the accelerating voltage power supply 4 through separate resistors 17 and which are movable relative to the accelerating grid 3, being a set of separate isolated from each other grid elements 18, which are connected to the negative pole of the accelerating voltage power supply 4 through separate resistors 19. The movable electrodes 16 can make up a screen 20 which covers the accelerating grid 3 after the source cut-off and protects the grid 3 and the gas discharge chamber 1 from contamination with impurities.

Figure 4:
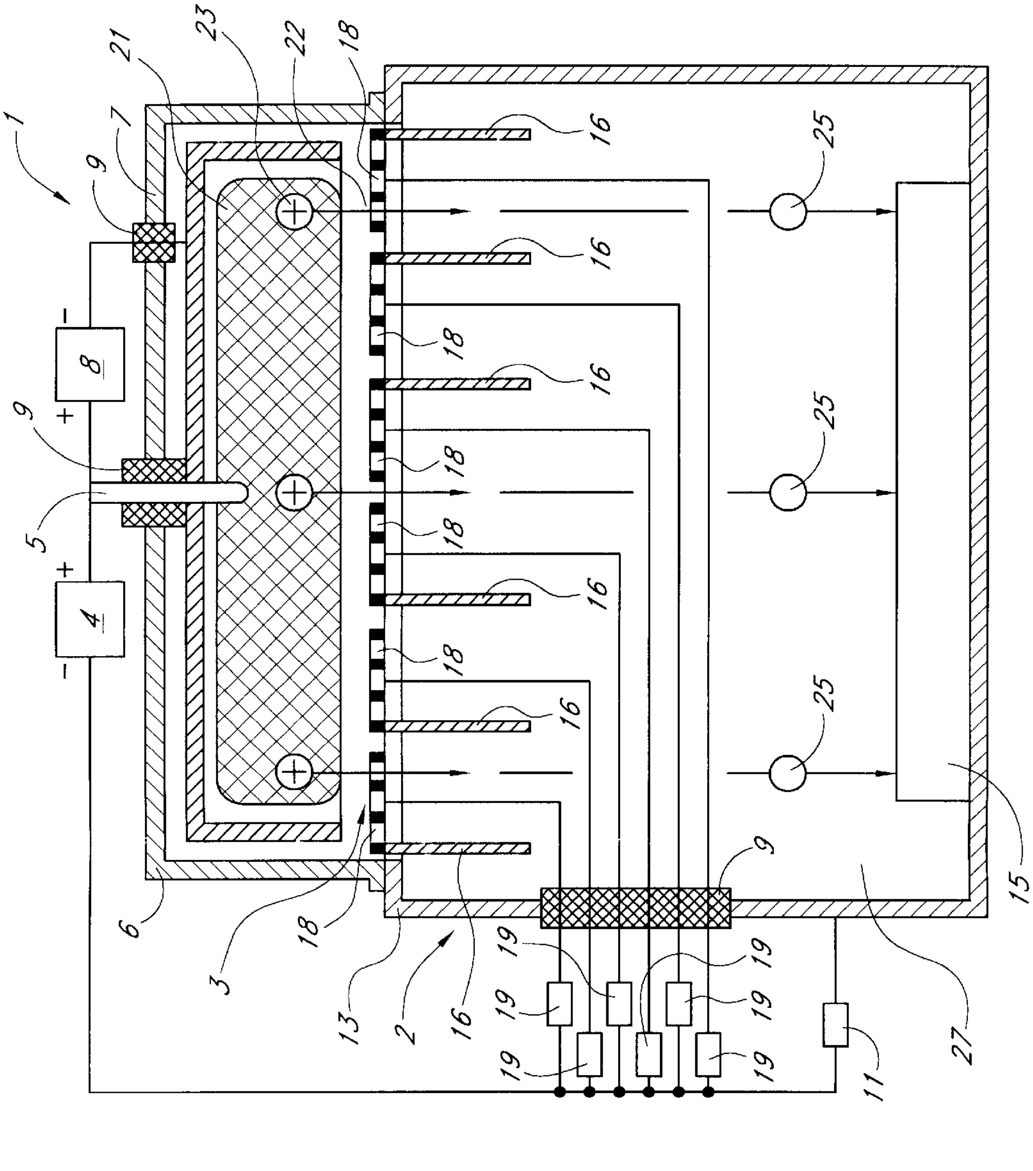
FIG. 4 is a schematic diagram of the source of fast neutral molecules with additional electrodes electrically connected to the separate grid elements the working vacuum chamber being used as the charge transfer chamber.

Presented in the FIG. 4 modification of the source of fast neutral molecules is characterised in that the additional electrodes 16 are isolated from each other and are connected to separate grid elements 18 which are connected to the negative pole of the accelerating voltage power supply 4 through separate resistors 19 as well as in that the working vacuum chamber 13 is used as the charge transfer chamber 2.

In addition, in the FIG. 1, 2, 3 and 4 are presented schematically:

plasma emitter 21, positive space charge layer 22, accelerated ions 23, slow gas molecules 24, fast neutral molecules 25, slow secondary ions 26 and synthesised plasma 27.

The mode of operation of the source of fast neutral molecules according to the invention is as follows.

The chamber 2 is being pumped down to the air pressure value of $10^{-3}$ Pa, then an ion-producing gas is admitted to fill the chamber, for instance, through the connecting pipe 10, and the gas pressure in the gas discharge chamber 1 increases up to 0.1–0.5 Pa. By switching on the gas discharge power supply 8 a voltage of several hundred volts is put between the anode 5 and the cathode 7. A voltage of the same or higher value is put between the anode 5 and the accelerating grid 3 by switching on the accelerating voltage power supply 4. Using an igniting system (omitted in the drawings) a gas discharge is ignited in the gas discharge chamber 1. As a result the hollow cathode 7 is being filled with a homogeneous plasma emitter 21, its potential being practically equal to the potential of the anode 5. The ions 23 accelerated in the positive space charge layer 22 between the plasma emitter 21 and the grid 3 enter through holes of the grid 3 the charge transfer chamber 2 where they turn at a distance from the grid 3 comparable with the charge transfer length L into fast neutral molecules 25 as a result of collisions with gas molecules 24. Changes of accelerated particles velocity direction and kinetic energy in the charge transfer process are negligible. Produced in this process slow secondary ions 26 come to the grid 3 and to the walls of the charge transfer chamber 2 which emit as a result of ion-electron emission secondary electrons neutralising the positive ion space charge in the charge transfer chamber 2. As a result of the neutralisation a synthesised plasma 27 is produced which is filling the charge transfer chamber 2. As the charge transfer length L is less than the width A of the accelerating grid 3, the maximum of the synthesised plasma density distribution is located close to the grid 3.

When the accelerating grid 3 is connected to the negative pole of the accelerating voltage power supply 4 the charge transfer chamber 2 and the accelerating grid 3 are equipotential and positive relative to them potential of the synthesised plasma 27, as it has been found out experimentally, automatically reaches the value of about 100 V (or even more, depending on holes diameter of the accelerating grid 3 and on the current of the accelerated ions 23). This value of potential drop between the synthesised plasma 27 and the accelerating grid 3 is enough to limit the electron flow from the synthesised plasma 27 through the accelerating grid 3 to the gas discharge chamber 1. Velocity directions of gas molecules 24 taking part in the charge transfer collisions with accelerated ions 23 are distributed isotropically and for this reason the number of slow secondary ions 26 moving towards the accelerating grid 3 should be comparable with the number of slow secondary ions 26 moving from the accelerating grid 3. But as the maximum of the synthesised plasma density distribution is located close to the grid 3 and as the electrical field of the accelerating grid 3 penetrates into the synthesised plasma 27 and is attracting the slow secondary ions 26 produced near the grid 3, for this reason the number of secondary ions 26 coming to the grid 3 substantially exceeds the number of those coming to the walls of the charge transfer chamber 2. As a result arc cathode spots of vacuum arc occur by electrical breakdowns mainly on the grid 3. On the walls of the charge transfer chamber 2 or on the walls of connected with it electrically working vacuum chamber 13 they occur seldom and much more seldom they occur on the surfaces of the products 15 under treatment which are distant enough from the grid 3.

Low probability of damage with arc cathode spot traces provides for higher quality of the products 15. Elimination of the repeated accelerating grid negative potential regulating by every change of beam current, of accelerating voltage, of gas pressure or of sort of ion-producing gas provides for easier control of the source of fast neutral molecules that allows to increase its reliability.

When the negative pole of the accelerating voltage power supply 4 is connected to the charge transfer chamber 2 through the resistor 11 (FIG. 2) then a voltage drop across the resistor 11 induced by the current of ions from the synthesised plasma 27 coming to the walls of charge transfer chamber 2 and by the current of electrons from the synthesised plasma 27 coming into the gas discharge chamber 1 induces a negative relative to the charge transfer chamber 2 potential $U_g$ of the grid 3 thus limiting further the current of electrons coming into the gas discharge chamber 1 through the grid 3 from the synthesised plasma 27. When resistance of the resistor 11 is increasing positive potential of the synthesised plasma 27 relative to the charge transfer chamber 2, to the working vacuum chamber 13 and to the products 15 under treatment which are connected electrically to each other is falling down to its minimum value of about 10 V. As a result probability of break-downs between the synthesised plasma 27 and the products 15 under treatment usually followed with break-downs between the synthesised plasma 27 and the plasma emitter 21 is further decreasing and probability of cathode spots appearance on the products 15 under treatment is also decreasing.

Under the influence of the electric field of the grid 3 a redistribution of the currents takes also place: the part of the secondary ions 26 current which flows in the circuit of the accelerating grid 3 is increasing and the part of the secondary ions 26 current which flows in the circuit of the charge transfer chamber 2 is decreasing. Resistance of the resistor 11 needed to induces the same potential $U_g$ of the grid 3 should grow. As a result the maximum current of the accelerating voltage power supply 4 in the circuit of the charge transfer chamber 2 resulting from a break-down between the charge transfer chamber 2 and the electrode of the gas discharge chamber 1 can get less than the minimum current of a stable vacuum arc. For this reason break-downs leading to ignition of a vacuum arc discharge with cathode spots on the walls of the charge transfer chamber 2, of the working vacuum chamber 13 and on the products 15 under treatment can be eliminated.

Moreover, during any pre-arc instability accompanied with an abrupt current increase of electrons coming into the gas discharge chamber 1 from the synthesised plasma 27 a correspondent increase of voltage drop across the resistor 11 induces high negative potential $U_g$ of the grid 3 which cuts off the electron current thus averting appearance of even unstable arc cathode spots of short duration on the walls of the charge transfer chamber 2, of connected with it electrically working vacuum chamber 13 and on the products 15 under treatment loaded into the chamber 13. As a result damage of the products 15 under treatment with traces of arc cathode spots is eliminated. This allows to improve their quality.

When the additional electrodes 12 or 16 electrically connected to the negative pole of the accelerating voltage power supply 4 are positioned in the charge transfer chamber 2 a part of the secondary ions 26 come to the additional electrodes 12 or 16 and as a result the ion current in the circuit of the charge transfer chamber 2 and of the products 15 under treatment further decreases. As a result probability of the products 15 damage is further decreasing thus improving their quality. It is possible in this case to increase substantially the current of accelerated ions 23 and the product treatment rate practically without any change of voltage drop across the resistor 11.

When the accelerating grid 3 is a set of separate isolated from each other grid elements 18 connected to the negative pole of the accelerating voltage power supply 4 through separate resistors 19 (FIG. 3) or when the additional electrodes 16 are isolated from each other and electrically connected to those separate grid elements 18 (FIG. 4), or when the additional electrodes 16 are isolated from each other and connected to the negative pole of the accelerating voltage power supply 4 through separate resistors 17 (FIG. 3), it is possible in all those cases to eliminate the arc discharge ignition even if the accelerated voltage power supply 4 has no arc extinguishing circuit. For this purpose resistances of the resistors 17 and 19 are to be so high that a break-down short-circuit current of the accelerating voltage power supply 4 in the circuit of a separate grid element 18 (FIG. 3) or in the circuit of an additional electrode 16 (FIG. 3), or in the circuit of an additional electrode 16 electrically connected to a grid element 18 (FIG. 4) should be less than the minimum current of a stable vacuum arc. In this case electrical break-downs do not lead to ignition of a stationary arc and life-time of an unstable arc cathode spot on a separate grid element 18 or on a separate additional electrode 16 does not exceed 10–50 μs. This increases reliability of the device.

When the additional electrodes 16 are movable relative to the accelerating grid 3 and when they can make up a screen 20 covering the accelerating grid 3 after the source cut-off it is possible to protect the grid 3 and the gas discharge chamber 1 from contamination with impurities which cause arc ignition. This increases reliability of the device.

Filling of the gas discharge chamber 1 with an ion-producing gas through the accelerating grid 3 using the connecting pipe 10 which is positioned on the charge transfer chamber 2 allows to eliminate electrical break-downs which occur between the case 6 and electrodes 5 and 7 of the gas discharge chamber 1 and which are caused with a hollow cathode discharge ignition in the gas supplying channel when the gas is entering the gas discharge chamber 1 through an orifice in the wall of the case 6. This increases reliability of the device.

Using of the working vacuum chamber 13 as the charge transfer chamber 2 allows to simplify construction of the device.

When a cold hollow cathode with an emission opening facing the accelerating grid 3 is used as the cathode 7 of the gas discharge chamber 1 the useful life of the device is long enough even in the case of fast neutral molecules of oxygen and of other reactive gases because the gas discharge chamber 1 has no thermionic electron emitters which are disabled in a short time of operation in reactive gases and because the cathode 7 in operation is being continuously cleaned with ions accelerated up to energy of several hundred eV which are bombarding the cathode 7.

INDUSTRIAL APPLICABILITY

The source of fast neutral molecules, mainly broad cross-section beam source of fast neutral molecules, may be used for cleaning and heating of tools and other products in a working vacuum chamber before deposition onto them of coatings aimed at improvement of adhesion and quality of the coatings. It may be also used for coating modification during its deposition, for etching of various products with a broad reactive gas fast neutral molecule beam of low angular divergence, for surface polishing and for deposition of coatings, including dielectric coatings, by means of sputtering with a powerful broad cross-section beam of sheet targets made of any materials, including dielectrics.

The source of fast neutral molecules is remarkable for an easier control and a higher reliability. It allows to improve quality of treated products and to increase the treatment rate as a result of accelerated particle beam current growth.

What is claimed is:

1. A fast neutral molecule source, comprising:

a gas discharge chamber with a gas discharge power supply;

a charge transfer chamber;

an accelerating grid positioned between the gas discharge chamber and the charge transfer chamber, wherein the accelerating grid has a predetermined width;

an accelerating voltage power supply having a positive pole and a negative pole, the positive pole being connected to an electrode of the gas discharge chamber and the negative pole being connected to the charge transfer chamber; and a means to admit an ion-producing gas to fill the gas discharge chamber, wherein the accelerating grid is connected to the negative pole of the accelerating voltage power supply, and wherein the width of the accelerating grid exceeds within an ion-producing gas pressure range a charge transfer length being defined as:

$L=1/n\sigma$, where n is a gas molecule density in the gas discharge chamber, and $\sigma$ is charge transfer collision cross-section.

2. The fast neutral molecule source according to claim 1, wherein the negative pole of the accelerating voltage power supply is connected to the charge transfer chamber through a resistor.

3. The fast neutral molecule source according to claim 1, wherein additional electrodes are electrically connected to the negative pole of the accelerating voltage power supply and are positioned in the charge transfer chamber on a side of the accelerating grid.

4. The fast neutral molecule source according to claim 3, wherein the accelerating grid is a set of separate grid elements that are isolated from each other and connected to the negative pole of the accelerating voltage power supply through separate resistors.

5. The fast neutral molecule source according to claim 4, wherein the additional electrodes are isolated from each other and electrically connected to the separate grid elements.

6. The fast neutral molecule source according to claim 3, wherein the additional electrodes are isolated from each other and connected to the negative pole of the accelerating voltage power supply through separate resistors.

7. The fast neutral molecule source according to claim 3, wherein the additional electrodes are movable relative to the accelerating grid making up a screen covering the accelerating grid.

8. The fast neutral molecule source according to claim 1, wherein a connecting pipe of the means to admit an ion-producing gas to fill the gas discharge chamber through the accelerating grid is positioned on the charge transfer chamber.

9. The fast neutral molecule source according to claim 1, the charge transfer chamber is a working vacuum chamber for treating products.

10. The fast neutral molecule source according to claim 1, wherein a cathode of the gas discharge chamber is a cold hollow cathode with an emission opening facing the accelerating grid.

* * * * *